(12) United States Patent
Krogull et al.

(10) Patent No.: US 7,121,301 B2
(45) Date of Patent: Oct. 17, 2006

(54) FUEL TANK

(75) Inventors: Christian Krogull, Gelsenkirchen (DE); Frank Reiter, Haan (DE)

(73) Assignee: Siemens Aktiengesellschaft, Munich (DE)

( * ) Notice: Subject to any disclaimer, the term of this patent is extended or adjusted under 35 U.S.C. 154(b) by 264 days.

(21) Appl. No.: 10/829,774

(22) Filed: Apr. 22, 2004

(65) Prior Publication Data
US 2004/0244844 A1    Dec. 9, 2004

(30) Foreign Application Priority Data
Apr. 25, 2003   (DE)   ................. 103 18 844

(51) Int. Cl.
*F16K 24/00* (2006.01)
*B60K 15/035* (2006.01)

(52) U.S. Cl. .............. 137/587; 220/746; 123/516

(58) Field of Classification Search ........... 137/565.22, 137/565.34, 576, 587, 584; 123/509, 514, 123/516; 220/746, 747
See application file for complete search history.

(56) References Cited

U.S. PATENT DOCUMENTS

| | | | | |
|---|---|---|---|---|
| 3,917,109 A * | 11/1975 | MacDonald | ................. | 220/746 |
| 4,531,653 A * | 7/1985 | Sakata | .................... | 220/746 |
| 4,671,071 A * | 6/1987 | Sasaki | .................... | 220/746 |
| 4,836,402 A | 6/1989 | Sasaki | | |
| 6,209,594 B1 * | 4/2001 | Meyer et al. | ............... | 141/286 |
| 6,298,540 B1 | 10/2001 | Benjey et al. | | |
| 6,527,008 B1 * | 3/2003 | Meyer et al. | ................ | 137/587 |
| 6,591,866 B1 * | 7/2003 | Distelhoff et al. | ..... | 137/565.22 |
| 2001/0054446 A1 * | 12/2001 | Reiter | ................ | 137/587 |

FOREIGN PATENT DOCUMENTS

| | | |
|---|---|---|
| DE | 195 08 978 A1 | 9/1996 |
| DE | 196 25 629 A1 | 1/1997 |
| DE | 198 36 061 C1 | 3/2000 |
| DE | 100 21 054 A1 | 12/2000 |
| DE | 100 42 529 A1 | 3/2002 |
| DE | 101 48 506 A1 | 7/2002 |
| EP | 0 712 752 A1 | 7/1995 |
| EP | 1 262 354 A1 | 12/2002 |
| JP | 2001018667 A | 1/2001 |

* cited by examiner

*Primary Examiner*—Eric Keasel
*Assistant Examiner*—Cloud Lee
(74) *Attorney, Agent, or Firm*—Richard A. Speer; Mayer, Brown, Rowe & Maw LLP

(57) ABSTRACT

A fuel tank (1) has a constructional unit which can be preassembled and comprises a surge chamber (3) and venting device (6). The constructional unit is fastened to the bottom of the fuel tank (1) and has spring arms for prestressing openings (12, 13), which are provided for venting the fuel tank (1), against the upper wall of the fuel tank (1). The fuel tank (1) can be fitted in a particularly simple manner.

6 Claims, 2 Drawing Sheets

FUEL TANK

BACKGROUND OF THE INVENTION

The invention relates to a fuel tank having a surge chamber arranged in the bottom region, having a feed unit which sucks up fuel from the surge chamber, having a level sensor for detecting the fuel level in the fuel tank, and having a venting device which is arranged in the upper region of the fuel tank and is intended for venting the fuel tank during operation and/or when replenishing the fuel, the surge chamber, the feed unit and the level sensor being designed as a module which can be fitted outside the fuel tank and can be inserted into the fuel tank.

Fuel tanks of this type are frequently used in motor vehicles today and are known from practice. In this case, the fuel tank is manufactured as a single piece by blow molding or in a number of pieces by injection molding, and has an installation opening for the module. In the case of the fuel tank manufactured by injection molding, first of all at least two shell parts are manufactured and they are then welded to each other. The installation is carried out via assembling the module outside the fuel tank and inserting it through the installation opening into the fuel tank. The installation opening is subsequently closed with a closure cover.

One disadvantage of this is that the installation of the components in the fuel tank becomes very complicated as a result. Furthermore, support systems arranged in the tank are required for the fastening of the module and the venting device, said support systems taking up space in the fuel tank. This space is then no longer available to hold the fuel.

The invention is based on the problem of designing a fuel tank of the type mentioned at the beginning in such a manner that it has the greatest possible amount of space for holding fuel and can be fitted in as simple a manner as possible.

BRIEF DESCRIPTION OF THE INVENTION

This problem is solved according to the invention by the venting device being formed together with the module as a constructional unit which can be preassembled.

This design enables the module and the venting device to be fitted in one working step in the fuel tank according to the invention. This preferably takes place during the blow-molding process or, in the case of a multi-shell fuel tank, before the steel parts are welded together. This enables the fuel tank according to the invention to be fitted in a particularly simple manner. In the simplest case the fuel tank according to the invention does not require an installation opening for the venting device and the module. An escape of fuel from the fuel tank, for example due to leakages, diffusion or permeation, is therefore kept particularly small. Since the venting device is fastened directly to the module, a support system of the venting device on the wall of the fuel tank is not required either. As a result, the fuel tank according to the invention has a particularly large space available for holding fuel.

A contribution is made to further simplifying the installation of the fuel tank according to the invention if the preassembleable unit is fastened to the bottom of the fuel tank.

According to another advantageous development of the invention, if the bottom of the fuel tank should sag, a dipping of openings of the venting device into the fuel can be reliably avoided if openings of the venting device are prestressed against an upper wall of the fuel tank.

The surge chamber is frequently preferably filled when the fuel tank is refueled. According to another advantageous development of the invention, a preferred filling of this type requires a particularly low structural outlay if the preassembleable unit has a filling line which is guided from the surge chamber as far as a filler neck of the fuel tank.

To determine the level, a level sensor is arranged on the preassembleable unit, preferably on the surge chamber. Lever-type transmitters, submerged-pipe transmitters, ultrasonic transmitters, capacitive or thermo-electric transmitters can be used as the level sensors.

According to another advantageous development of the invention, the constructional unit turns out to be particularly compact if a connection of the filling line to the surge chamber has a float-type shut-off valve for blocking the supply of fuel when the surge chamber is full. However, a submerged pipe, a magnetic float-type shut-off valve or an electromagnetic valve is also conceivable for limiting the filling.

The fuel tank according to the invention requires a particularly small number of components if the venting device is fastened on an attachment of the surge chamber. The small number of components enables the fuel tank according to the invention to be manufactured particularly cost-effectively.

According to another advantageous development of the invention, the venting device turns out to be structurally particularly simple if it has a base part connected to the attachment of the surge chamber and side parts connected to the base part via lines, if the side parts and the base part are connected to one another via spring arms, and if openings of the venting device are arranged on the side parts. The spring arms are capable of prestressing the side parts and therefore the openings of the venting device against the upper wall of the fuel tank according to the invention.

A contribution is made to further reducing the number of components of the fuel tank according to the invention if the base part of the venting device or the attachment of the surge chamber has a connection for a forward-flow line. The base part preferably also holds a roll-over valve for blocking off the connection if the motor vehicle having the fuel tank according to the invention overturns.

According to another advantageous development of the invention, a contribution is made to further reducing the dimensions of the preassembleable unit if the attachment of the surge chamber is designed as a housing for an electronic system. An electronic system of this type is generally used for activating the electric motor of the feed unit or for detecting signals of the level sensor.

Said chambers generally have a covering. According to another advantageous development of the invention, a component which has to be fitted separately in order to cover the surge chamber can be avoided in a simple manner if the base part of the venting device upwardly covers the surge chamber.

BRIEF DESCRIPTION OF THE DRAWINGS

The invention permits numerous embodiments. To further clarify its basic principle, one of these is illustrated in the drawing and is described below. In the drawing

DETAILED DESCRIPTION OF THE INVENTION

Figure 1:
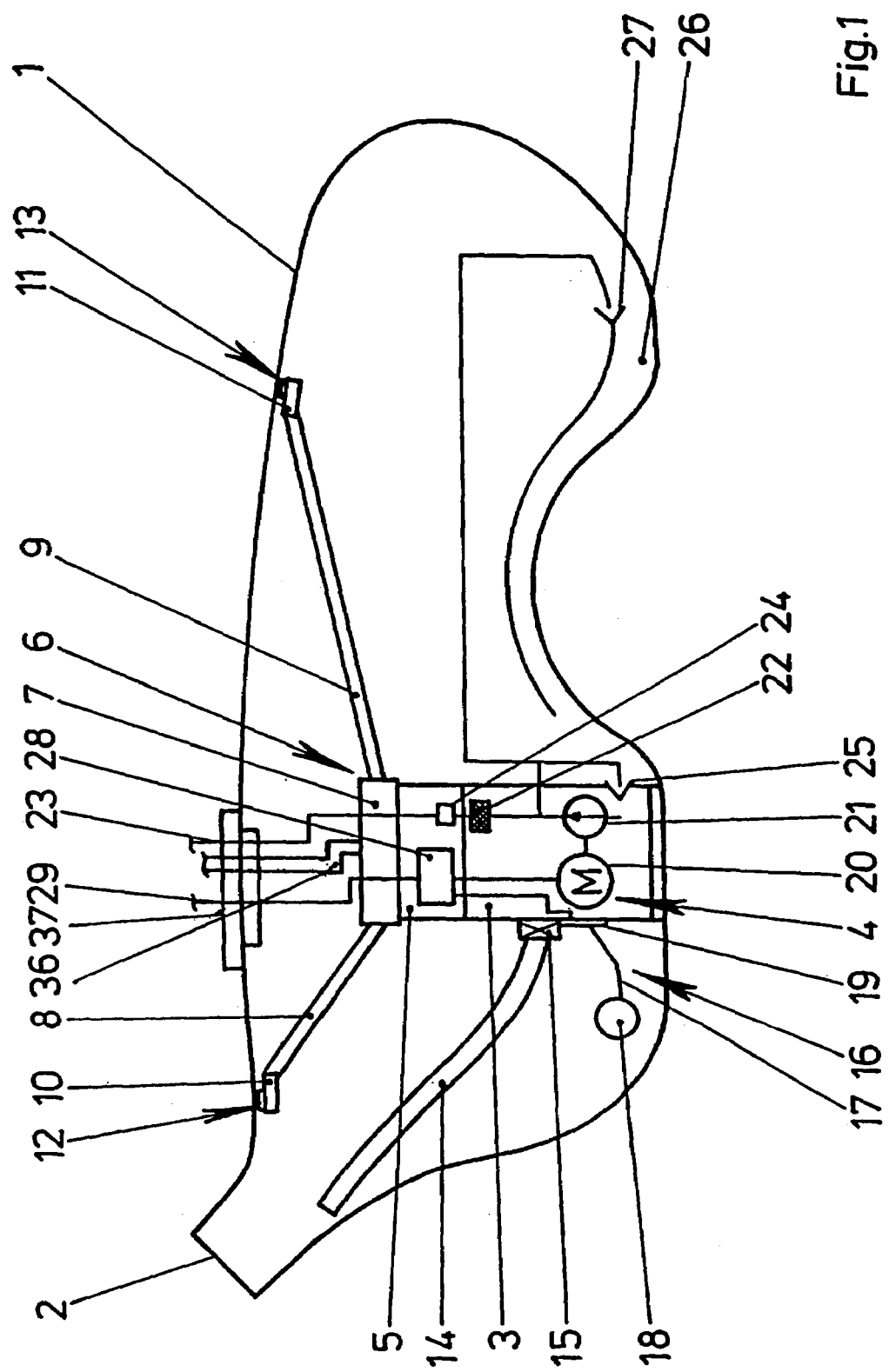
FIG. 1 shows, diagrammatically, a sectional illustration through a fuel tank according to the invention.

FIG. 1 shows a fuel tank 1 of a motor vehicle with a filler neck 2 and with a feed unit 4 which is arranged in a surge chamber 3. The surge chamber 3 is fastened to the bottom of the fuel tank 1 and has an attachment 5 for securing a venting device 6. The venting device 6 has a base part 7 fastened on the attachment 5, two side parts 10, 11 which are connected to the base part 7 via lines 8, 9 and are prestressed against the upper wall of the fuel tank 1, and a ventilating and venting line 36 which is guided through a closure 37 closing the fuel tank 1. Openings 12, 13 of the venting device 6 are arranged on the side parts 10, 11. The surge chamber 3 is connected to the filler neck 2 of the fuel tank 1 via a filling line 14. It is therefore ensured that the surge chamber 3 is filled first of all when the fuel tank 1 is being replenished. An overfilling of the surge chamber 3 is prevented by a float-type shutoff valve 15 arranged in the connection of the filling line 14 to the surge chamber 3. When the surge chamber 3 is full, the fuel passes directly into the fuel tank 1. A level sensor 16 having a float 18 arranged on a lever arm 17 is fastened to the outside of the surge chamber 3. The deflection of the lever arm 17, and therefore the fuel level in the fuel tank 1, is converted via a lever-type transmitter 19 into electric signals.

The feed unit 4 has a fuel pump 21 which is driven by an electric motor 20. The fuel pump 21 feeds fuel from the surge chamber 3 through a fuel filter 22 into a forward-flow line 23 leading to an internal combustion engine (not illustrated) of the motor vehicle. The forward-flow line 23 penetrates the base part 7 of the venting device 6. A roll-over valve 24 which closes the forward-flow line 23 if the motor vehicle overturns is arranged in the attachment 5 of the surge chamber 3. Furthermore, the fuel pump 21 feeds fuel to a suction jet pump 25 arranged in the surge chamber 3 and to a suction jet pump 27 arranged in a secondary chamber 26. Fuel is fed to the surge chamber 3 via the suction jet pump 27 arranged in the secondary chamber 26.

An electronic system 28 is arranged in the attachment 5 of the surge chamber 3 and is connected to the lever-type transmitter 19 and to the electric motor 20 of the feed unit 4. Furthermore, the electronic system 28 has lines 29 leading out of the fuel tank 1. These lines 29 are used to supply the electric motor 20 with electric current and to supply signals of the level sensor 16 to a display (not illustrated) in the motor vehicle.

Figure 2:
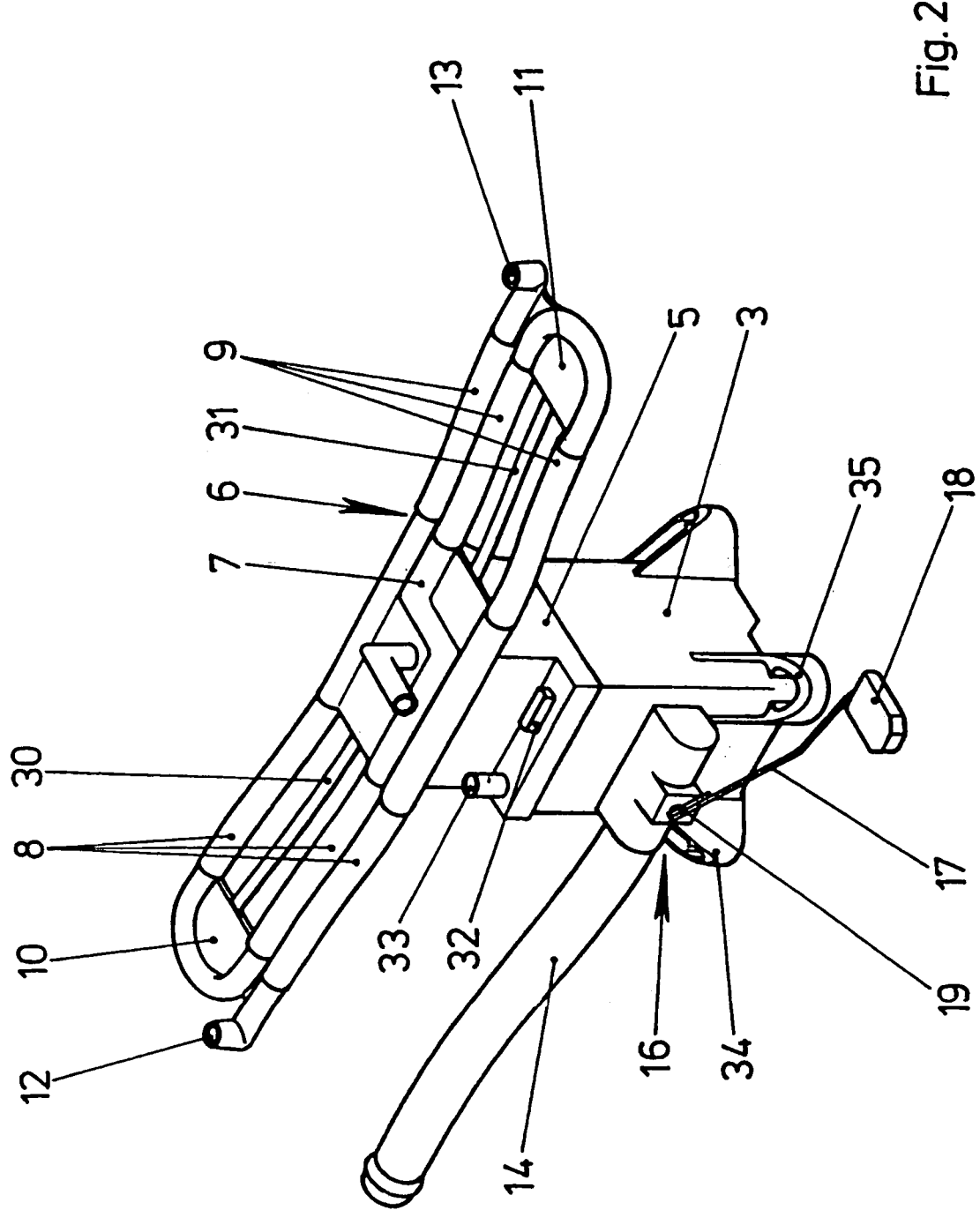
FIG. 2 shows a perspective illustration of a preassembleable unit of the fuel tank according to the invention from FIG. 1.

FIG. 2 shows a module comprising surge chamber 3 and level sensor 16 perspectively. The module is designed together with the venting device 6 as a preassembled constructional unit. The preassembled constructional unit illustrated in FIG. 2 is fastened to the bottom of the fuel tank 1 during the manufacturing of the fuel tank 1 in the blow-molding process or before two half shells of the fuel tank 1 illustrated in FIG. 1 are welded together. After the fuel tank 1 has been manufactured, the side parts 10, 11 of the venting device 6 are prestressed against the upper wall of the fuel tank 1. For the prestressing against the upper wall, the side parts 10, 11 are connected to the base part 7 via spring arms 30, 31. The attachment 5 of the surge chamber 3 bears electrical connections 32 for the electronic system 28 illustrated in FIG. 1 and a connection 33 for the forward-flow line 23. FIG. 2 furthermore shows that the base part 7 of the venting device 6 likewise has an opening. The latter serves to vent the surge chamber 3. For the fastening to the bottom of the fuel tank, the surge chamber 3 has fastening tabs 34, 35 on which buffers (not illustrated) for acoustic decoupling are arranged.

The invention claimed is:

1. A fuel tank having a surge chamber (3) arranged in the bottom region, having a feed unit which sucks up fuel from the surge chamber, having a level sensor for detecting the fuel level in the fuel tank, and having a venting device (6) which is arranged in the upper region of the fuel tank and is intended for venting the fuel tank during operation and/or when replenishing the fuel, the surge chamber, the feed unit and the level sensor being designed as a module which can be fitted outside the fuel tank and can be inserted into the fuel tank, characterized in that the venting device (6) includes:
    (a) a base part (7) mounted on the surge chamber (3), the base part having an interior that is vented to the outside of the tank;
    (b) side parts (10, 11) spaced from the base part (7) having openings (12, 13) providing access into lines (8, 9), whereby connection is established between the interior of the tank and the interior of the base part (7); and
    (c) spring arms (30, 31) extending between base part (7) and the side parts (10, 11) to bias the openings (12, 13) against the upper wall of the tank.

2. The fuel tank as claimed in claim 1, characterized in that the preassembleable unit is fastened to the bottom of the fuel tank (1).

3. The fuel tank as defined in claim 1, wherein the venting device (6) is fastened on an attachment (5) of the surge chamber (3).

4. The fuel tank as defined in claim 3, wherein the base part (7) of the venting device (6) or the attachment (5) of the surge chamber (3) has a connection (33) for a forward-flow line (23).

5. The fuel tank as defined in claim 3, wherein the attachment (5) of the surge chamber (3) is designed as a housing for an electronic system (28).

6. The fuel tank as defined in claim 1, wherein the venting device (6) has a base part (7) that covers the surge chamber (3).

* * * * *